United States Patent
Gspaltl et al.

(10) Patent No.: US 6,565,788 B2
(45) Date of Patent: May 20, 2003

(54) PROCESS FOR THE PRODUCTION OF CELLULOSIC FLAT FILMS

(75) Inventors: Peter Gspaltl, Grambach (AT); Christian Schlossnikl, Vöcklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

(21) Appl. No.: 09/839,908

(22) Filed: Apr. 20, 2001

(65) Prior Publication Data

US 2002/0045038 A1 Apr. 18, 2002

Related U.S. Application Data

(63) Continuation of application No. PCT/AT99/00252, filed on Oct. 20, 1999.

(30) Foreign Application Priority Data

Oct. 22, 1998 (AT) ............................................. 1777/98

(51) Int. Cl.$^7$ ............................................. B29C 47/14
(52) U.S. Cl. ................... 264/187; 264/211.13
(58) Field of Search .............................. 264/187, 210.4, 264/211.13, 233

(56) References Cited

U.S. PATENT DOCUMENTS

| | | | |
|---|---|---|---|
| 5,417,909 A | | 5/1995 | Michels et al. |
| 6,165,401 A | * | 12/2000 | Schlossnikl et al. |
| 6,177,035 B1 | * | 1/2001 | Schlossnikl et al. |

FOREIGN PATENT DOCUMENTS

| | | | |
|---|---|---|---|
| CA | 1171615 | * | 7/1984 |
| DE | 4421482 | | 6/1994 |
| EP | 0574870 | | 6/1993 |
| WO | 9724215 | | 7/1997 |
| WO | 9737392 | | 10/1997 |
| WO | 9849223 | | 11/1998 |

* cited by examiner

Primary Examiner—Mark Eashoo
(74) Attorney, Agent, or Firm—Baker & Botts, L.L.P.

(57) ABSTRACT

The invention relates to a process for the production of cellulosic flat films whereby a solution of cellulose is extruded in an aqueous tertiary amine oxide by means of an extrusion die which has an extrusion gap whereby the solution is moulded in the shape of a film and the extruded solution is led via an air gap to a precipitation bath. The process in accordance with the invention is characterized in that an extrusion die is used which has an extrusion gap b of $220\ \mu m \leqq b \leqq 280\ \mu m$. Moreover, the invention relates to flat films, obtainable by the amine oxide process with a thickness d of less than $20\ \mu m$, a width B of more than 30 cm, and a factor f of 65 or less, whereby f is defined as $f=d*(MD/TD)$, d is used in $\mu m$ and whereby MD stands for the tenacity of the film in the longitudinal direction ($N/mm^2$) and TD for the tenacity of the film in the transverse direction ($N/mm^2$).

8 Claims, No Drawings

PROCESS FOR THE PRODUCTION OF CELLULOSIC FLAT FILMS

This is a continuation of copending application Serial No. PCT/AT99/00252 filed Oct. 20, 1999, which is incorporated by reference herein. PCT/AT99/00252 was not published in English.

The present invention relates to a process for the production of cellulosic flat films in accordance with the generic part of claim 1.

Some suggestions have already been made regarding the production of cellulosic flat films according to the so-called "amine oxide process", in which the flat film is made from a solution of cellulose in an aqueous tertiary amine oxide. Since N-methyl morpholine-N-oxide ("NMMO") is preferably used as the tertiary amine oxide, the term "NMMO" is used in the following to represent all the suitable tertiary amine oxides.

Thus EP-A 0 574 870 describes amongst other things the production of a cellulosic film by means of extruding a solution of cellulose in aqueous NMMO through a die which has an extrusion gap, the width of which lies in the range of 50 to 200 $\mu$m. In the examples provided in EP-A 0 574 870 cellulose solutions are extruded through dies with a gap length of 4 cm and a gap width of 50 $\mu$m, 100 $\mu$m, 150 $\mu$m, 200 $\mu$m and 300 $\mu$m.

EP-A 0 574 870 emphasises that the highest possible shear gradient should be reached in the moulding tool whereby high tenacity values are to be reached in the moulded body even when the drafting in the air gap is low. According to EP-A 0 574 870 this should be achieved by keeping the diameter of the extrusion tool (in the case of films the width of the extrusion gap) at a low level. In this connection, however, EP-A 0 574 870 only examines the tenacities of the films produced in the longitudinal direction.

From PCT-WO 97/37392 the production of a flat film according to the amine oxide process via a die with an extrusion gap with a length of 1 m and a width of 100 $\mu$m is known.

The laid-open Austrian patent application A 705/97 describes the production of cellulosic flat films according to the amine oxide process by means of the extrusion of the cellulose solution via a die, the extrusion gap of which has a length of at least 40 cm. In the examples provided in A 705/97 the width of the extrusion gap equals respectively 100 $\mu$m, 300 $\mu$m, 500 $\mu$m or 1000 $\mu$m.

In many fields of application for flat films high tenacities transverse to the extrusion direction are desired in addition to good tenacities in the longitudinal direction. With regard to the production of flat films with larger widths in particular, e.g. as of 30 cm and more, it is, however, difficult to attain equal properties in the longitudinal and transverse direction. It is especially difficult to obtain equal properties when it comes to the production of relatively thin films, e.g. films with a thickness of less than 20 $\mu$m.

In this connection, DE 195 15 137 describes that the flat films described in EP-A 0 574 870 (respectively in DE 42 19 658 which corresponds to EP-A 0 574 870) have performance values in need of improvement particularly with regard to the mechanical properties transverse to the extrusion direction since drafting is performed exclusively in the longitudinal direction and as a result of the crystallinity connected with this. As a solution DE 195 15 137 describes a process in which first of all a cellulose tube is produced using the well-known blowing process, said tube being then cut open to a flat film.

Another possibility to improve the tenacity of flat films in the transverse direction is to stretch the film-like moulded solution in the air gap transversally to the direction of extrusion. A process of this kind is described e.g. in PCT-WO 97/24215 but it involves a great amount of efforts.

The present invention sets itself the task of providing a process for the production of cellulosic flat films according to the amine oxide process with which thin flat films with equal tenacity properties in the longitudinal and transverse direction can be produced without the additional need for stretching transversally to the direction of extrusion.

The present invention furthermore sets itself the task of providing a cellulosic flat film having been only monoaxially stretched which has an equal relationship between the tenacity properties in the longitudinal and transverse direction even with a larger film width and with lower thicknesses.

The task of the invention is resolved by the process in accordance with the invention by means of using an extrusion die which has an extrusion gap with a width b of 220 $\mu$m $\leq$ b $\leq$ 280 $\mu$m.

Surprisingly it has been seen that by choosing the width of the extrusion gap correctly, given the same tenacity in the longitudinal direction, the transverse tenacity of the flat film can be improved quite considerably.

In this respect it is important to not keep the width of the extrusion gap too low since with low widths of the extrusion gap as is described in EP-A 0 574 870 poor properties in the transverse direction in the flat film result.

Thus for example the transverse tenacities of the flat films, which are extruded via a die with an extrusion gap with a width of b=150 $\mu$m, are at a very low level. The transverse tenacities of flat films which are extruded in otherwise comparable conditions via a die with an extrusion gap with a width of b=220 $\mu$m, are by comparison at a much higher level.

If, however, one advances to higher values for the width of the extrusion gap, e.g. to 300 $\mu$m or more, this effect is not as pronounced. 220 $\mu$m $\leq$ b $\leq$ 280 $\mu$m, and preferably 240 $\mu$ $\leq$ b $\leq$ 260 $\mu$m would appear to be the optimum range for the width of the extrusion gap.

The extrusion gap preferably has a length l of 40 cm $\leq$ l.

The film-like moulded solution can be drawn off in the air gap in the extrusion direction at a speed of 0.2 to 20-times the speed with which the film-like moulded solution emerges from the extrusion gap.

The length in the extrusion direction of the last parallel section of the die, before the solution emerges from the die, preferably equals more than 1 mm, and 5 mm to 20 mm are even better.

The task of the invention is further resolved by a monoaxially stretched cellulosic flat film obtainable by the amine oxide process, said film having a thickness d of less than 20 $\mu$m, a width B of more than 30 cm, and a factor f of 65 or less whereby f is defined as f=d*(MD/TD), d is used in $\mu$m and whereby MD stands for the tenacity of the film in the longitudinal direction (N/mm$^2$) and TD for the tenacity of the film in the transverse direction (N/mm$^2$).

The factor f preferably equals 60 or less in the flat film in accordance with the invention.

The flat films in accordance with the invention, therefore, reveal a very well-balance relationship between the tenacities in the longitudinal and transverse direction, even with very low thicknesses, although they are not stretched in the transverse direction. In combination with the greater width of the flat film in accordance with the invention this results in an advantageous flat film for numerous different applications.

The process in accordance with the invention is explained further by means of examples. In all the examples the flat films produced had a width of more than 30 cm.

EXAMPLE 1 (COMPARATIVE EXAMPLE)

A cellulose solution with a temperature of 100° C. containing 12.0 weight percentage of cellulose, 77.0 weight percentage of NMMO and 11.0 weight percentage of water, was extruded using a flat die with an extrusion gap with a length of 40 cm and a width of 150 $\mu$m, with a throughput of 37.8 kg/h through an air gap of 20 mm into a precipitation bath comprising 80 weight percentage of NMMO and 20 weight percentage of water.

The cellulose solution which is moulded as a flat film emerged from the die with an extrusion speed of 8.3 m/min and was drawn off at the same speed. This means that the film was not stretched in the longitudinal direction.

The film was treated with glycerine and then it was dried. The dried film had the following properties:

| | |
|---|---|
| Thickness ($\mu$m): | 48 |
| Tenacity, in the longitudinal direction (N/mm$^2$): | 176 |
| Tenacity, in the transverse direction (N/mm$^2$): | 45 |
| Factor f: | 188 |

EXAMPLE 2 (COMPARATIVE EXAMPLE)

The means of procedure was the same as in example 1 only the film was drawn off at 2 times the extrusion speed. The dry film had the following properties:

| | |
|---|---|
| Thickness ($\mu$m): | 22 |
| Tenacity, longitudinal direction (N/mm$^2$): | 222 |
| Tenacity, transverse direction (N/mm$^2$): | 31 |
| Factor f: | 158 |

EXAMPLE 3 (COMPARATIVE EXAMPLE)

The means of procedure was the same as in example 1 only the film was drawn off at 3 times the extrusion speed. The dry film had the following properties:

| | |
|---|---|
| Thickness ($\mu$m): | 18 |
| Tenacity, longitudinal direction (N/mm$^2$): | 233 |
| Tenacity, transverse direction (N/mm$^2$): | 30 |
| Factor f: | 140 |

EXAMPLE 4 (COMPARATIVE EXAMPLE)

The means of procedure was the same as in example 1 only the film was drawn off at 5 times the extrusion speed. The dry film had the following properties:

| | |
|---|---|
| Thickness ($\mu$m): | 10 |
| Tenacity, longitudinal direction (N/mm$^2$): | 252 |
| Tenacity, transverse direction (N/mm$^2$): | 23 |
| Factor f: | 110 |

EXAMPLE 5 (COMPARATIVE EXAMPLE)

The means of procedure was the same as in example 1 only the cellulose solution was extruded with a throughput rate of 189 kg/h. The cellulose solution moulded as a flat film emerged from the die with an extrusion speed of 41.6 m/min and was drawn off at the same speed. This means that the film was not stretched in the longitudinal direction. The dry film had the following properties:

| | |
|---|---|
| Thickness ($\mu$m): | 50 |
| Tenacity, longitudinal direction (N/mm$^2$): | 185 |
| Tenacity, transverse direction (N/mm$^2$): | 41 |
| Factor f: | 226 |

From the comparative examples 1 to 5 it can be seen that factor f, which describes the relationship between the tenacity in the longitudinal and transverse direction depending on the thickness d, is always above 100.

EXAMPLE 6

The means of procedure was the same as in example 1 only the extrusion gap had a width of 220 $\mu$m.

The cellulose solution moulded as a flat film emerged from the die at an extrusion speed of 5.7 m/min and was drawn off at the same speed. This means that the film was not stretched in the longitudinal direction. The dry film had the following properties:

| | |
|---|---|
| Thickness ($\mu$m): | 50 |
| Tenacity, longitudinal direction (N/mm$^2$): | 167 |
| Tenacity, transverse direction (N/mm$^2$): | 86 |
| Factor f: | 97 |

EXAMPLE 7

The means of procedure was the same as in example 6 only the film was drawn off at 2 times the extrusion speed. The dry film had the following properties:

| | |
|---|---|
| Thickness ($\mu$m): | 24 |
| Tenacity, longitudinal direction (N/mm$^2$): | 210 |
| Tenacity, transverse direction (N/mm$^2$): | 78 |
| Factor f: | 65 |

EXAMPLE 8

The means of procedure was the same as in example 6 only the film was drawn off at 3 times the extrusion speed. The dry film had the following properties:

| | |
|---|---|
| Thickness ($\mu$m): | 19 |
| Tenacity, longitudinal direction (N/mm$^2$): | 223 |
| Tenacity, transverse direction (N/mm$^2$): | 69 |
| Factor f: | 61 |

EXAMPLE 9

The means of procedure was the same as in example 6 only the film was drawn off at 4 times the extrusion speed. The dry film had the following properties:

| | |
|---|---|
| Thickness ($\mu$m): | 13 |
| Tenacity, longitudinal direction (N/mm$^2$): | 232 |
| Tenacity, in the transverse direction (N/mm$^2$): | 65 |
| Factor f: | 46 |

EXAMPLE 10

The means of procedure was the same as in example 6 only the film was drawn off at 5 times the extrusion speed. The dry film had the following properties:

| | |
|---|---|
| Thickness (μm): | 11 |
| Tenacity, in longitudinal direction (N/mm²): | 243 |
| Tenacity, in transverse direction (N/mm²): | 59 |
| Factor f: | 45 |

EXAMPLE 11

The means of procedure was the same as in example 6 only the cellulose solution was extruded with a throughput of 189 kg/h. The cellulose solution moulded as a flat film emerged from the die at an extrusion speed of 28.4 m/min and was drawn off at the same speed. This means that the film was not stretched in the longitudinal direction. The dry film had the following properties:

| | |
|---|---|
| Thickness (μm): | 53 |
| Tenacity, in longitudinal direction (N/mm²): | 174 |
| Tenacity, in transverse direction (N/mm²): | 79 |
| Factor f: | 117 |

From the comparison of examples 6 to 11 with the comparative examples of 1 to 5 it emerges quite clearly that in what are otherwise the same conditions, the transverse tenacities of the flat films produced in the process in accordance with the invention are clearly at a higher level. Moreover, it is clear that factor f in films with a thickness of less than 20 μm equals less than 65, and less than 60 in particular. Thus the films have a very equal relationship between tenacity in the transverse and longitudinal direction.

EXAMPLE 12

The means of procedure was the same as in example 1 only the extrusion gap had a width of 250 μm.

The cellulose solution moulded as a flat film emerged from the die with an extrusion speed of 5.0 m/min and was drawn off at the same speed. This means that the film was not stretched in the longitudinal direction. The dry film demonstrated the following properties:

| | |
|---|---|
| Thickness (μm): | 64 |
| Tenacity, in longitudinal direction (N/mm²): | 152 |
| Tenacity, in transverse direction (N/mm²): | 92 |
| Factor f: | 106 |

EXAMPLE 13

The means of procedure was the same as in example 12 only the film was drawn off at 2 times the extrusion speed. The dry film had the following properties:

| | |
|---|---|
| Thickness (μm): | 36 |
| Tenacity, longitudinal direction (N/mm²): | 200 |
| Tenacity, in transverse direction (N/mm²): | 81 |
| Factor f: | 89 |

EXAMPLE 14

The means of procedure was the same as in example 12 only the film was drawn off at 3 times the extrusion speed. The dry film had the following properties:

| | |
|---|---|
| Thickness (μm): | 24 |
| Tenacity, longitudinal direction (N/mm²): | 210 |
| Tenacity, transverse direction (N/mm²): | 74 |
| Factor f: | 68 |

EXAMPLE 15

The means of procedure was the same as in example 12 only the film was drawn off at 5 times the extrusion speed. The dry film had the following properties:

| | |
|---|---|
| Thickness (μm): | 16 |
| Tenacity, longitudinal direction (N/mm²): | 230 |
| Tenacity, transverse direction (N/mm²): | 64 |
| Factor f: | 58 |

EXAMPLE 16

The means of procedure was the same as in example 12 only the film was drawn off at 7 times the extrusion speed. The dry film had the following properties:

| | |
|---|---|
| Thickness (μm): | 12 |
| Tenacity, longitudinal direction (N/mm²): | 249 |
| Tenacity, transverse direction (N/mm²): | 55 |
| Factor f: | 54 |

EXAMPLE 17

The means of procedure was the same as in example 12 only the film was drawn off at 9 times the extrusion speed. The dry film had the following properties:

| | |
|---|---|
| Thickness (μm): | 9 |
| Tenacity, longitudinal direction (N/mm²): | 296 |
| Tenacity, transverse direction (N/mm²): | 41 |
| Factor f: | 65 |

EXAMPLE 18

The means of procedure was the same as in example 12 only the cellulose solution was extruded with a throughput of 189 kg/h. The cellulose solution moulded as a flat film emerged from the die with an extrusion speed of 25.0 m/min and was drawn off at the same speed. This means that the film was not stretched in the longitudinal direction. The dry film had the following properties:

| | |
|---|---|
| Thickness (μm): | 67 |
| Tenacity, longitudinal direction (N/mm²): | 164 |
| Tenacity, transverse direction (N/mm²): | 87 |
| Factor f: | 126 |

EXAMPLE 19

The means of procedure was the same as in example 1 only the extrusion gap had a width of 300 μm.

The cellulose solution moulded as a flat film emerged from the die at an extrusion speed of 4.2 m/min and was drawn off at the same speed. This means that the film was not stretched in the longitudinal direction. The dry film had the following properties:

| | |
|---|---|
| Thickness (μm): | 77 |
| Tenacity, longitudinal direction (N/mm²): | 137 |
| Tenacity, transverse direction (N/mm²): | 98 |
| Factor f: | 108 |

EXAMPLE 20

The means of procedure was the same as in example 19 only the film was drawn off at 2 times the extrusion speed. The dry film had the following properties:

| | |
|---|---|
| Thickness (μm): | 44 |
| Tenacity, longitudinal direction (N/mm²): | 187 |
| Tenacity, transverse direction (N/mm²): | 91 |
| Factor f: | 90 |

EXAMPLE 21

The means of procedure was the same as in example 19 only the film was drawn off at 3 times the extrusion speed. The dry film had the following properties:

| | |
|---|---|
| Thickness (μm): | 30 |
| Tenacity, longitudinal direction (N/mm²): | 204 |
| Tenacity, transverse direction (N/mm²): | 79 |
| Factor f: | 77 |

EXAMPLE 22

The means of procedure was the same as in example 19 only the film was drawn off at 5 times the extrusion speed. The dry film had the following properties:

| | |
|---|---|
| Thickness (μm): | 19 |
| Tenacity, longitudinal direction (N/mm²): | 219 |
| Tenacity, transverse direction (N/mm²): | 69 |
| Factor f: | 60 |

EXAMPLE 23

The means of procedure was the same as in example 19 only the film was drawn off at 7 times the extrusion speed. The dry film had the following properties:

| | |
|---|---|
| Thickness (μm): | 14 |
| Tenacity, longitudinal direction (N/mm²): | 225 |
| Tenacity, transverse direction (N/mm²): | 59 |
| Factor f: | 53 |

EXAMPLE 24

The means of procedure was the same as in example 19 only the film was drawn off at 9 times the extrusion speed. The dry film had the following properties:

| | |
|---|---|
| Thickness (μm): | 11 |
| Tenacity, longitudinal direction (N/mm²): | 257 |
| Tenacity, transverse direction (N/mm²): | 49 |
| Factor f: | 58 |

EXAMPLE 25

The means of procedure was the same as in example 19 only the cellulose solution was extruded with a throughput of 189 kg/h. The cellulose solution moulded as a flat film emerged from the die with an extrusion speed of 20.8 m/min and was drawn off at the same speed. This means that the film was not stretched in the longitudinal direction. The dry film had the following properties:

| | |
|---|---|
| Thickness (μm): | 90 |
| Tenacity, longitudinal direction (N/mm²): | 155 |
| Tenacity, transverse direction (N/mm²): | 89 |
| Factor f: | 157 |

From examples 19 to 25 it emerges that with a die gap of 300 μm the tenacity properties of the films produced are equally good respectively only slightly better than in examples 12 to 18.

What is claimed is:

1. A process for producing a cellulosic flat film comprising (i) extruding a solution of cellulose in an aqueous tertiary amine oxide by means of an extrusion die, which has an extrusion gap, whereby the solution is shaped in the form of a film, and (ii) leading the extruded solution via an air gap into a precipitation bath, wherein the extrusion die has an extrusion gap with a width b, wherein 220 μm≦b≦280 μm, to produce a cellulosic flat film having improved transverse tenacity.

2. The process according to claim 1, wherein 240 μm≦b≦260 μm.

3. The process according to claim 1 or 2, wherein the extrusion gap has a length l wherein 40 cm≦l.

4. The process of claim 1, wherein the cellulosic flat film has a thickness of less than 20 microns.

5. A process for producing a cellulosic flat film comprising (i) extruding a solution of cellulose in an aqueous tertiary amine oxide by means of an extrusion die which has an extrusion gap having a width of between 220 and 300 microns to form a moulded film of solution, and (2) drawing off the moulded film at a speed greater than the speed at which the film which is extruded, wherein the flat film produced has a width of more than 30 centimeters.

6. The process for producing a cellulosic flat film of claim 5, where the speed at which the film is drawn off is up to 20-fold greater than the speed at which the moulded film is extruded.

7. The process for producing a cellulosic flat film of claim 6, wherein the cellulosic flat film has a thickness of less than 20 microns.

8. The process for producing a cellulosic flat film of claim 5, wherein the cellulosic flat film has a thickness of less than 20 microns.

* * * * *